(12) United States Patent
Kikuchi et al.

(10) Patent No.: US 6,684,307 B2
(45) Date of Patent: Jan. 27, 2004

(54) DUPLEX DISK CONTROLLER

(75) Inventors: Yasuhiro Kikuchi, Kanagawa (JP); Naoyuki Otoshi, Kanagawa (JP); Akira Yamada, Osaka (JP); Hiroshi Okuyama, Osaka (JP)

(73) Assignee: Matsushita Electric Indsutrial Co., Ltd., Osaka (JP)

(*) Notice: Subject to any disclaimer, the term of this patent is extended or adjusted under 35 U.S.C. 154(b) by 144 days.

(21) Appl. No.: 09/757,967

(22) Filed: Jan. 10, 2001

(65) Prior Publication Data

US 2001/0009023 A1 Jul. 19, 2001

(30) Foreign Application Priority Data

Jan. 13, 2000 (JP) ........................................ P. 2000-4804

(51) Int. Cl.⁷ .............................................. G06F 13/00
(52) U.S. Cl. ....................... 711/162; 711/163; 711/154; 711/4; 711/112
(58) Field of Search ............................ 711/4, 111, 112, 711/114, 154, 158, 162, 163; 713/100

(56) References Cited

U.S. PATENT DOCUMENTS

| | | | | |
|---|---|---|---|---|
| 5,321,826 A | * | 6/1994 | Ushiro | 711/162 |
| 5,491,593 A | * | 2/1996 | Donaldson | 360/73.02 |
| 5,553,230 A | * | 9/1996 | Petersen et al. | 714/1 |
| 5,649,233 A | * | 7/1997 | Chen | 710/104 |
| 5,727,213 A | * | 3/1998 | Vander Kamp et al. | 710/104 |
| 5,729,735 A | * | 3/1998 | Meyering | 707/10 |
| 5,828,820 A | * | 10/1998 | Onishi et al. | 711/162 |
| 6,067,618 A | * | 5/2000 | Weber | 713/1 |
| 6,073,220 A | * | 6/2000 | Gunderson | 711/162 |
| 6,209,060 B1 | * | 3/2001 | Machida | 711/114 |
| 6,505,281 B1 | * | 1/2003 | Sherry | 711/168 |

FOREIGN PATENT DOCUMENTS

| | | | |
|---|---|---|---|
| JP | 404215142 A | * | 8/1992 |
| JP | 404367023 A | * | 12/1992 |
| JP | 406019635 A | * | 1/1994 |
| JP | 406124171 A | * | 5/1994 |

OTHER PUBLICATIONS

Kris Jamsa, Hard Disk Power with The Jamsa Disk Utilities, SAMS, 1990, pp 41–60.*

* cited by examiner

Primary Examiner—Hong Kim
(74) Attorney, Agent, or Firm—Pearne & Gordon LLP

(57) ABSTRACT

A disk device controller (1) performs reading/writing of data and management information from/to a first disk device (4) and a second disk device (5). The first disk device (4) and the second disk device (5) hold their device information and storing the management information and the data from the disk device controller (1). A reference device information holder (3) holds previously set reference device information peculiar to the device. A master disk decider (2) decides which one of the first disk device (4) and the second disk device is the master disk, based on the device information and the management information held in the first disk device (4) and the second disk device (5), and the reference device information held in the reference device information holder (3).

10 Claims, 6 Drawing Sheets

DUPLEX DISK CONTROLLER

BACKGROUND OF THE INVENTION

The present invention relates to a duplex disk controller in a computer system.

If important data are lost by the failure of the hard disk in the computer system, such loss of data has a fatal influence upon the overall system. Therefore, normally a system for duplicating the hard disk and writing the same data in dual disks is employed.

Accordingly, if one hard disk is out of order, the system operation can be continued based on data contents written on the other hard disk.

In this case, if data stored in both hard disks do not coincide with each other or if one of the hard disks is exchanged because of the failure, etc., the hard disk that stores the latest data (master disk) must be automatically decided in starting the computer system, and then the data stored in both hard disks must be made equal by copying data contents in the master disk into the other hard disk (slave disk).

Thus, as a means for automatically deciding the master disk, the duplex disk controller is disclosed in Japanese Patent No.2665199.

According to such duplex disk controller, it is intended to compensate the consistency between data contents in the dual hard disk by using partner disk error information, time stamp, and own device number.

Figure 7:
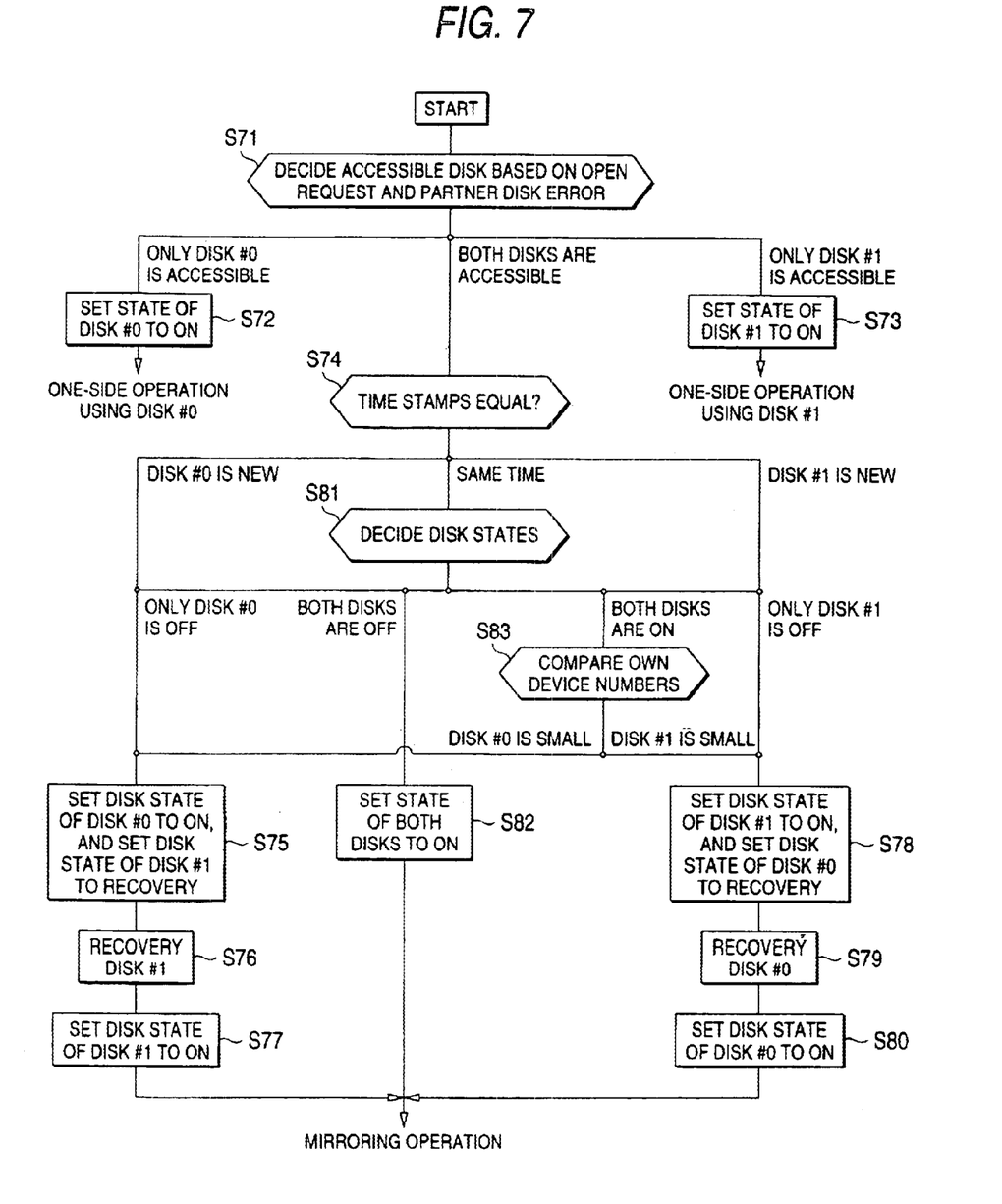
FIG. 7 a flowchart showing processing operations in a master disk deciding process in a duplex disk controller in the conventional art.

Then, a duplex disk controller in the conventional art will be explained hereunder. FIG. 7 is a flowchart showing processing operations in a master disk deciding process in the duplex disk controller in the conventional art. In this case, one hard disk denotes a disk #0 and the other hard disk denotes a disk #1.

In starting the computer system shown in FIG. 7, an accessible disk is detected based on open requests issued to both disks (disk #0 and disk #1) respectively and partner disk error information stored in both disks respectively (step S71).

If only the disk #0 is accessible, a disk state of the disk #0 is set to ON and then one-side operation using the disk #0 is performed (step S72).

If only the disk #1 is accessible, a disk state of the disk #1 is set to ON and then one-side operation using the disk #1 is performed (step S73).

If both disks are accessible, time stamps stored in the disk #0 and the disk #1 respectively are compared with each other (step S74). Where the time stamp corresponds to time information concerning data update time.

If the time stamp of the disk #0 is new, the data in the disk #1 is recovered based on the disk #0. In other words, the disk state of the disk #0 is set to ON, and the disk state of the disk #1 is set to the recovery (step S75) Then, the recovery of the disk #1 is performed (step S76). After the recovery is finished, the disk state of the disk #1 is changed from the recovery to ON (step S77). Then, the mirroring operation is started.

In step S74, it is decided that the time stamp of the disk #1 is new, data of the disk #0 are recovered based on the disk #1. In other words, the disk state of the disk #1 is set to ON, and the disk state of the disk #0 is set to the recovery (step S78). Then, the recovery of the disk #0 is performed (step S79). After the recovery is finished, the disk state of the disk #0 is changed from the recovery to ON (step S80). Then, the mirroring operation is started.

In step S74, it is decided that the time stamps of both disks are the same time, the disk states are checked (step S81) If the disk states stored in both disks are OFF, such disk states of both disks are set to ON (step S82). Then, the mirroring operation is started.

In step S81, only the disk state of the disk #0 is OFF, data of the disk #1 are recovered based on the disk #0 (step S75 to step S77). Then, the mirroring operation is started.

In step S81, only the disk state of the disk #1 is OFF, data of the disk #0 are recovered based on the disk #1 (step S78 to step 580). Then, the mirroring operation is started.

In step S81, it is decided that the disk states of both disks are ON, own device numbers stored in both disks are compared with each other (step S83).

If own device number of the disk #0 is small, the data of the disk #1 are recovered based on the disk #0 (step S75 to step S77). Then, the mirroring operation is started. If own device number of the disk #1 is small, the data of the disk #0 are recovered based on the disk #1 (step S78 to step S80). Then, the mirroring operation is started.

As described above, according to the above duplex disk controller in the conventional art, the master disk is decided by using partner disk error information, time stamp, and own device number, and then the data contents in both disks are made to coincide with each other by copying the data from the master disk to the slave disk.

However, according to the above duplex disk controller in the conventional art, if one of or both hard disks (the first hard disk and the second hard disk) are exchanged because of the failure of the hard disk or the version up of the software, in some cases it cannot be decided precisely which disk system among the first disk device and the second disk device corresponds to the master disk.

In other words, in the case of the duplex disk controller in the conventional art, the process is performed under the assumption that the latest data are surely stored in the disk having smaller own device number. However, in case the latest data are stored in the disk having larger own device number, the disk in which old data are stored is decided as the master disk and thus the latest data are erased.

Also, the process performed when own device numbers of both disks coincide with each other and the process performed when the hard disk of the different system is installed are not disclosed at all.

SUMMARY OF THE INVENTION

It is an object of the present invention to provide a duplex disk controller capable of deciding precisely a master disk and compensating consistency of data contents between disk devices even if a hard disk is exchanged.

In order to attain the above object, a duplex disk controller of the present invention comprises a first disk device and a second disk device; and a disk device controller for storing data into both the first disk device and the second disk device to duplicate the data; wherein the disk device controller uses a device number assigned previously to CPU as reference device information, holds the device number in both the first disk device and the second disk device, collates device numbers held in the first disk device and the second disk device respectively with the reference device information, and decides which one of the first disk device and the second disk device corresponds to a master disk, based on a collated result.

According to the above configuration, even if the hard disk is exchanged, the master disk can be identified by the simple procedures, and in turn the consistency of the data contents between the first disk device and the second disk device can be compensated.

Also, a duplex disk controller of the present invention comprises a first disk device for holding first device information, a second disk device for holding second device information, a disk device controller for reading/writing data from/to the first disk device and the second disk device and reading/writing management information including data writing update time and a status flag which is different before and after data writing update, a reference device information holder for holding peculiar reference device information previously, and a master disk decider for collating the first device information held in the first disk device and the second device information held in the second disk device with reference device information held in the reference device information holder, and then deciding which one of the first disk device and the second disk device corresponds to a master disk, based on collated results and contents of the management information.

According to the above configuration, the disk device controller can identify precisely which one of the first disk device and the second disk device corresponds to the master disk by employing the management information such as the data update times and a flag status that is different before and after the data update in addition to the reference device information as decision factors.

Also, in the duplex disk controller of the present invention, the reference device information, the first device information, and the second device information contain a MAC (Media Access Control) address.

According to the above configuration, since the MAC address is assigned to the first disk device and the second disk device as the reference device information respectively, the master disk can be identified precisely based on the MAC address peculiar to the device.

Also, in the duplex disk controller of the present invention, the reference device information, the first device information, and the second device information contain MAC addresses and partition information.

According to the above configuration, the type of the first disk device and the second disk device can be specified, and then it can be identified more precisely by adding the decision of the MAC address which one of the first disk device and the second disk device corresponds to the master disk.

DETAILED DESCRIPTION OF THE PREFERRED EMBODIMENTS

Embodiment 1

Figure 1:
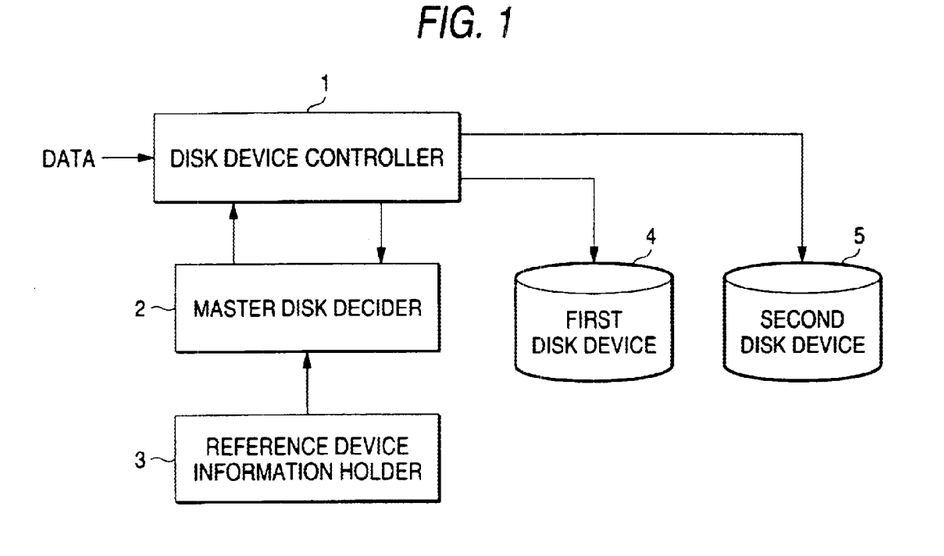
FIG. 1 is a block diagram showing a schematic configuration of an interior of a duplex disk controller showing an embodiment 1 of the present invention.

FIG. 1 is a block diagram showing a schematic configuration of an interior of a duplex disk controller shown in an embodiment 1 of the present invention.

A disk device controller 1 performs reading/writing of data and management information from/to a first disk device 4 and a second disk device 5.

The first disk device 4 and the second disk device 5 duplicate data contents by holding device information and storing the data and the management information loaded from the disk device controller 1. In this case, the management information includes an update time and a flag.

A master disk decider 2 decides which one of the first disk device 4 and the second disk device is the master disk, based on the device information and the management information held in the first disk device 4, the device information and the management information held in the second disk device 5, and the device information held in a reference device information holder 3.

The reference device information holder 3 holds previously set reference device information peculiar to the device.

Figure 2:
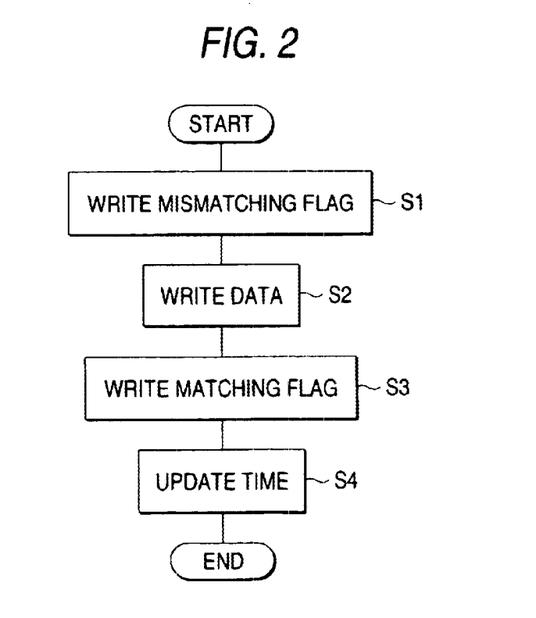
FIG. 2 is a flowchart showing processing operations in a data writing process in the embodiment 1.

An operation of the above embodiment 1 will be explained with reference to flowcharts shown in FIG. 2 to FIG. 5 hereunder. FIG. 2 is a flowchart showing processing operations in a data writing process.

When a data writing request is generated, as shown in FIG. 2, the disk device controller 1 writes a mismatching flag into the first disk device 4 and the second disk device 5 (step S1), and then writes the data (step S2).

After writing of the data into the first disk device 4 and the second disk device 5 is finished, the disk device controller 1 writes a matching flag into the first disk device 4 and the second disk device 5 (step S3), and then updates an update time (step S4).

Figure 3:
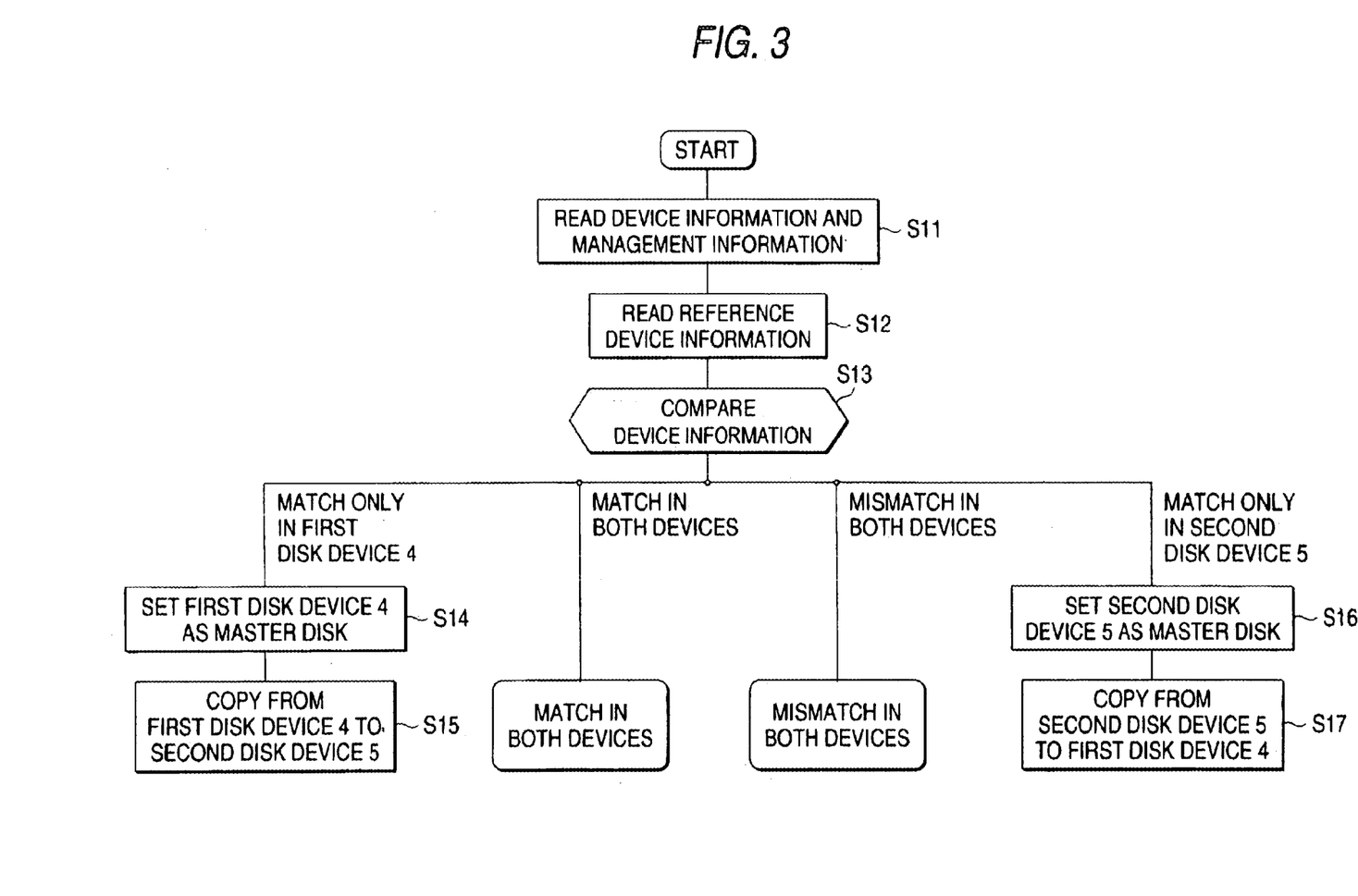
FIG. 3 is a flowchart showing processing operations in a master disk deciding process in the embodiment 1.

FIG. 3 is a flowchart showing processing operations in a master disk deciding process when a power supply of a computer system is turned on.

When the power supply of the computer system is turned on, as shown in FIG. 3, the disk device controller 1 reads the device information and the management information from both the first disk device 4 and the second disk device 5, and then outputs them to the master disk decider 2 (step S11).

Also, the master disk decider 2 reads the reference device information from the reference device information holder 3 (step S12).

The master disk decider 2 decides the master disk based on the device information held in the first disk device 4 and the second disk device 5, the management information read from the first disk device 4 and the second disk device 5, and the reference device information held in the reference device information holder 3.

In other words, the device information read from the first disk device 4 and the second disk device 5 are compared with each other on the basis of the reference device information held in the reference device information holder 3 (step S13). If only the device information in the first disk device 4 coincides with the reference device information, the master disk decider 2 decides that the second disk device 5 is exchanged and then decides the first disk device 4 as the master disk and the second disk device 5 as the slave disk (step S14), and then copies data contents of the first disk device 4 into the second disk device 5 (step S15).

If only the device information in the second disk device 5 coincide with the reference device information, similarly the master disk decider 2 decides that the first disk device 4 is exchanged and then decides the second disk device 5 as the master disk and the first disk device 4 as the slave disk (step S16), and then copies data contents of the second disk device 5 into the first disk device 4 (step S17).

Figure 4:
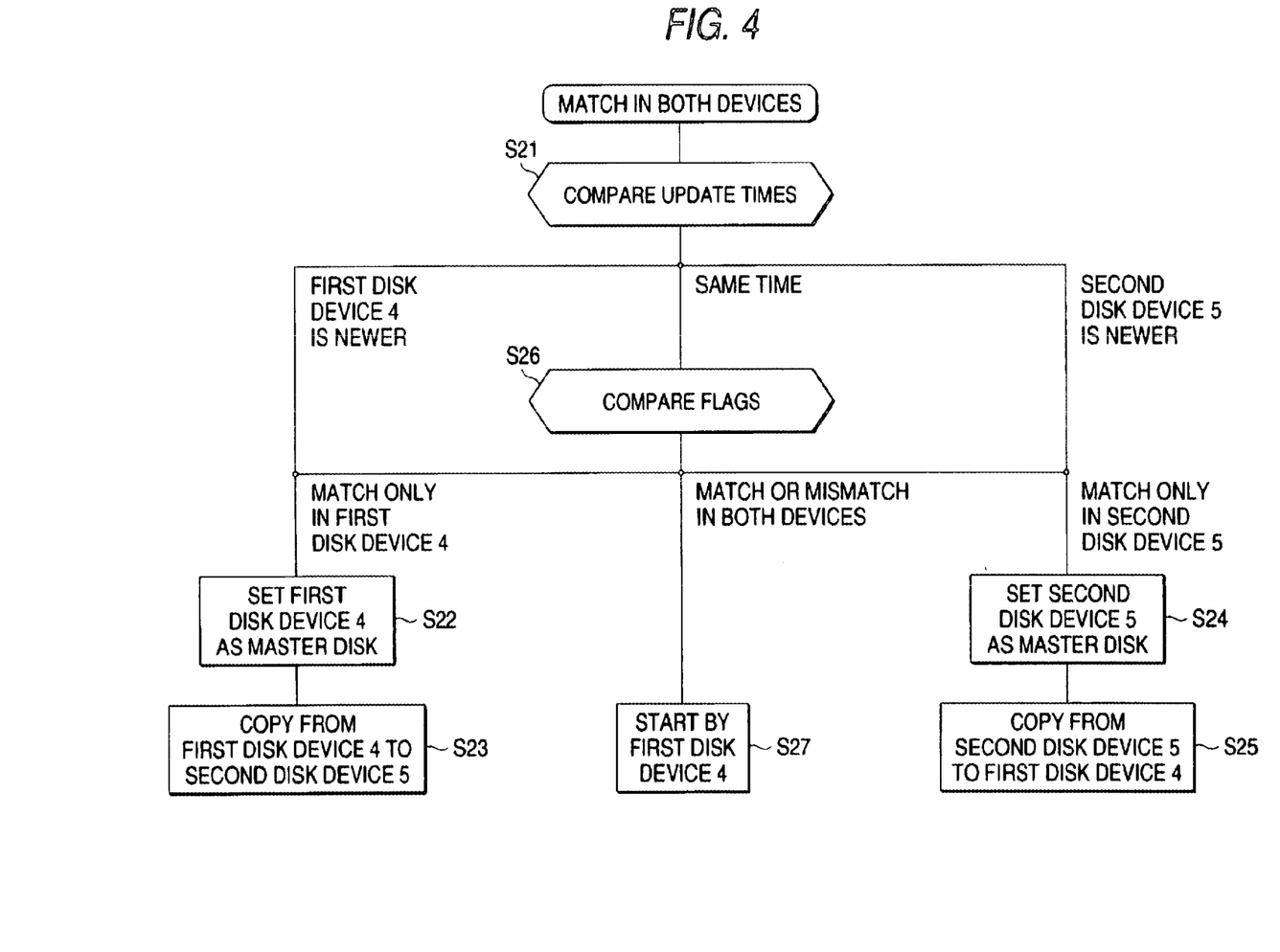
FIG. 4 is a flowchart showing processing operations in the master disk deciding process in the embodiment 1.

In step S13, if the device information in both the first disk device 4 and the second disk device 5 coincide with the reference device information, the process moves to the process operation shown in FIG. 4. In contrast, in step S13, if the device information in both the first disk device 4 and the second disk device 5 do not coincide with the reference device information, the process moves to the process operation shown in FIG. 5.

FIG. 4 is a flowchart showing processing operations in the master disk deciding process when both the device information of the first disk device 4 and the second disk device 5 coincide with the device information of the reference device information holder 3.

In step S13, if the device information in both the first disk device 4 and the second disk device 5 coincide with the reference device information, the master disk decider 2 compare update times read from the first disk device 4 and the second disk device 5 in step S11 in order to use the update time as a decision factor (step S21).

If the update time of the first disk device 4 is newer, the master disk decider 2 decides the first disk device 4 as the master disk and the second disk device 5 as the slave disk (step S22), and then copies the data contents of the first disk device 4 into the second disk device 5 (step S23).

If the update time of the second disk device 5 is newer, the master disk decider 2 decides the second disk device 5 as the master disk and the first disk device 4 as the slave disk (step S24), and then copies the data contents of the second disk device 5 into the first disk device 4 (step S25).

If the update times are the same time, the master disk decider 2 compares flags that are read from the first disk device 4 and the second disk device 5 in step S11 (step S26).

If only the flag read from the first disk device 4 is a matching flag, the master disk decider 2 decides the first disk device 4 as the master disk and the second disk device 5 as the slave disk (step S22), and then copies the data contents of the first disk device 4 into the second disk device 5 (step S23).

If only the flag read from the second disk device 5 is a matching flag, the master disk decider 2 decides the second disk device 5 as the master disk and the first disk device 4 as the slave disk (step S24), and then copies the data contents of the second disk device 5 into the first disk device 4 (step S25).

If both flags read from the first disk device 4 and the second disk device 5 are a matching flag or a mismatching flag, the system is started by the first disk device 4, as previously set (step S27).

Figure 5:
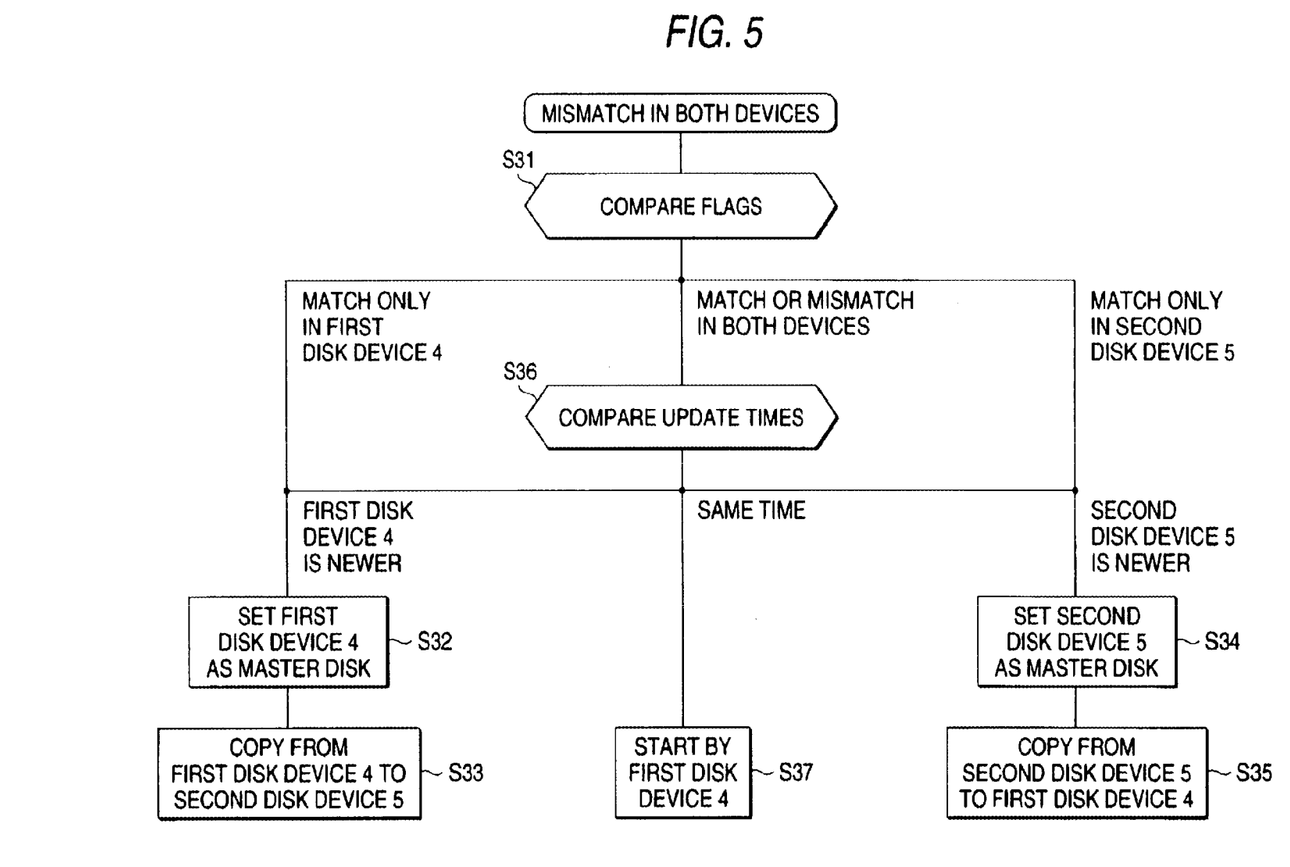
FIG. 5 is a flowchart showing processing operations in the master disk deciding process in the embodiment 1.

FIG. 5 is a flowchart showing processing operations in the master disk deciding process when both the device information of the first disk device 4 and second disk device 5 do not coincide with the device information of the reference device information holder 3.

In step S13 in FIG. 3, if both device information of the first disk device 4 and the second disk device 5 do not coincide with the reference device information, it is decided that both the first disk device 4 and the second disk device 5 are exchanged.

At this time, if the hard disk which has the newer update time but into which the mismatching flag is written is decided as the master disk, there is such a possibility that the system down is caused since the copy source becomes error in data copying. Therefore, if both device information do not coincide with the reference device information, the master disk decider 2 compares flags that are read from the first disk device 4 and the second disk device 5 in step S11 (step S31)

If only the flag read from the first disk device 4 is the matching flag, the master disk decider 2 decides the first disk device 4 as the master disk and the second disk device 5 as the slave disk (step S32), and then copies the data contents of the first disk device 4 into the second disk device 5 (step S33).

In step S31, if only the flag read from the second disk device 5 is the matching flag, the master disk decider 2 decides the second disk device 5 as the master disk and the first disk device 4 as the slave disk (step S34), and then copies the data contents of the second disk device 5 into the first disk device 4 (step S35).

If both flags read from the first disk device 4 and the second disk device 5 are a matching flag or a mismatching flag, the master disk decider 2 compares update times that are read from the first disk device 4 and the second disk device 5 in step S11 (step S36).

If the update time of the first disk device 4 is newer, the master disk decider 2 decides the first disk device 4 as the master disk and the second disk device 5 as the slave disk (step S32), and then copies the data contents of the first disk device 4 into the second disk device 5 (step S33).

In step S36, if the update time of the second disk device 5 is newer, the master disk decider 2 decides the second disk device 5 as the master disk and the first disk device 4 as the slave disk (step S34), and then copies the data contents of the second disk device 5 into the first disk device 4 (step S35).

If the update times are the same time, the system is started by the first disk device 4, as previously set (step S37).

As explained above, according to the embodiment 1, even if one of or both the first disk device 4 and the second disk device 5 are exchanged, it can be decided by using the management information and the device information as decision factors which one of the first disk device 4 and the second disk device 5 is the master disk. In turn, the consistency of the data contents stored in the hard disks can be compensated without fail.

In this event, an example is discussed in the above explanation in which the system is started by the first disk device 4 in compliance with the setting previously defined in step S27 and step 537, however, the system may be started by the second disk device 5.

Embodiment 2

An embodiment 2 of the present invention is different from the embodiment 1 in that a MAC address to which a value peculiar to the device is assigned is employed as the device information.

More particularly, in the block diagram shown in FIG. 1, the reference device information holder 3 holds the MAC addresses as the reference device information. Also, the first disk device 4 and the second disk device 5 hold the MAC address as the reference device information respectively.

The master disk decider 2 decides which one of the first disk device 4 and the second disk device 5 corresponds to the master disk, based on the MAC address held in the first disk device 4 and the management information stored, the MAC address held in the second disk device 5 and the management information stored, and the MAC addresses held in the reference device information holder 3.

In other words, in the flowcharts of the master disk deciding process shown in above FIG. 3 to FIG. 5, in step S11, the MAC address is read as the device information. Then, in step S12, the MAC address is read as the reference device information. Then, in step S13, the MAC addresses read from the first disk device 4 and the second disk device 5 are compared with the MAC addresses held in the reference device information holder 3, and then one of the first disk device 4 and the second disk device 5 is decided as the master disk based on the compared result.

According to the embodiment 2, since the MAC address to which the value peculiar to the device is assigned is employed as the device information, the master disk can be identified precisely based on the MAC address peculiar to the device.

Therefore, if one of or both the first disk device 4 and the second disk device 5 are exchanged with the disks in another system, either one of the first disk device 4 and the second disk device 5 can be decided as the master disk. The consistency of the data contents stored in the hard disks can be compensated without fail.

In the embodiment 2, an example in which the MAC address is employed as the device information is discussed. Information other than the MAC address may be employed if they exhibit the value peculiar to the device, and thus similarly the master disk can be decided.

As the reference device information, the device number of CPU used as the disk device controller 1, that controls reading/writing of the first disk device 4 and the second disk device 5, may be employed. Thus, the device number of CPU may be written into the first disk device 4 and the second disk device 5 and be held therein.

In this case, the disk device controller 1 can also decide which one of the first disk device 4 and the second disk device 5 corresponds to the master disk, based on the device number of CPU held in the first disk device 4 and the second disk device Embodiment 3

An embodiment 3 of the present invention is different from the embodiment 1 in that the MAC address and partition information are employed as the device information. More particularly, in the block diagram shown in FIG. 1, the reference device information holder 3 holds the MAC address and the partition information as the reference device information while the first disk device 4 and the second disk device 5 hold the MAC address and the partition information as the device information. Where the device information are logical information which the user can set freely every hard disk of the first disk device 4 and the second disk device 5.

The master disk decider 2 decides which one of the first disk device 4 and the second disk device 5 corresponds to the master disk, based on the MAC address, the partition information and the management information held in the first disk device 4, the MAC address, the partition information and the management information held in the second disk device 5, and the MAC addresses and the partition information held in the reference device information holder 3.

In the embodiment 3, decision of the master disk is carried out by adding a partition information comparing process to the master disk deciding process shown in FIG. 3.

Figure 6:
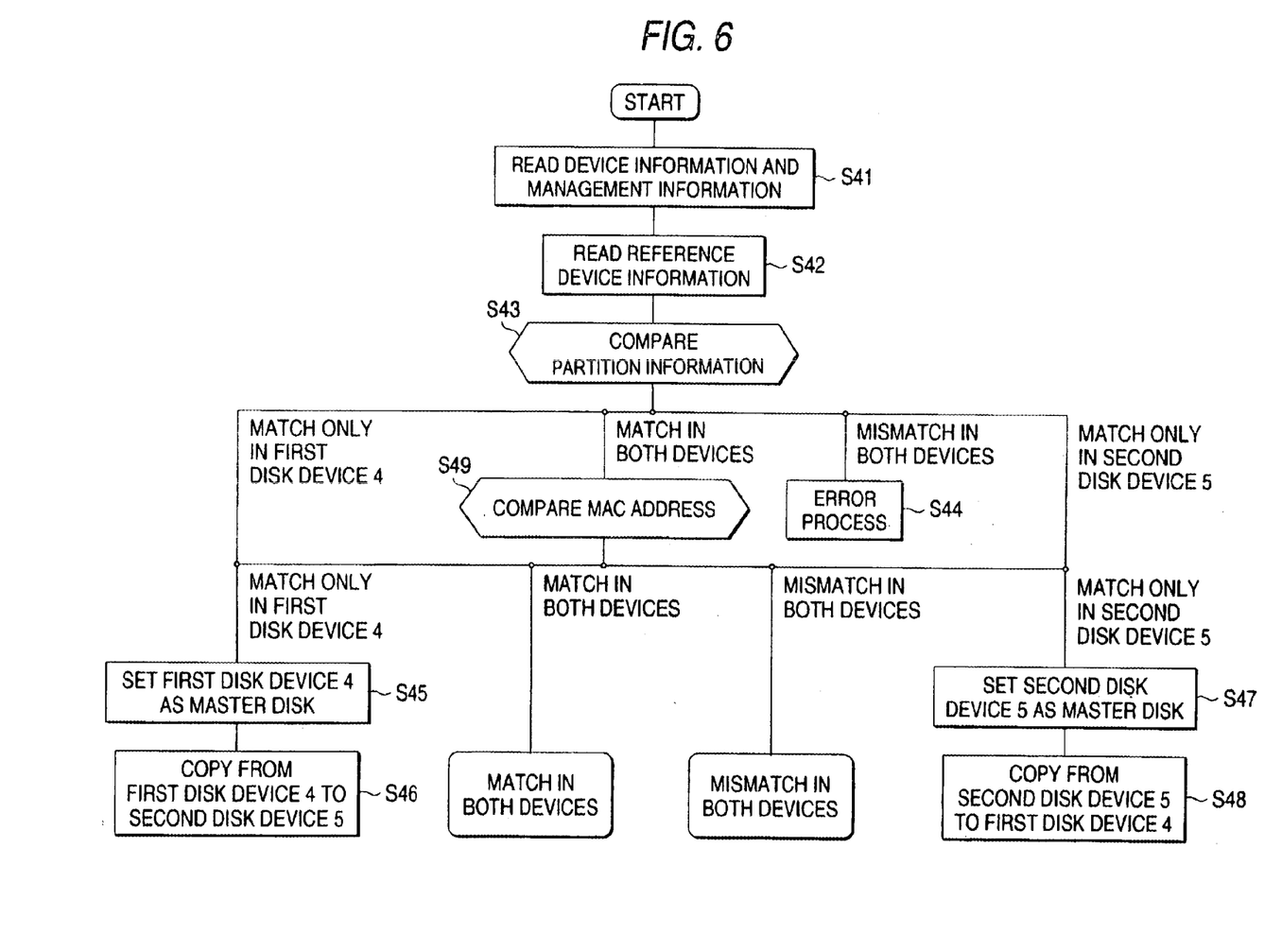
FIG. 6 a flowchart showing processing operations in a master disk deciding process in an embodiment 3.

FIG. 6 is a flowchart showing processing operations in a master disk deciding process in connection with the embodiment 3.

When the power supply of the computer system is turned on, as shown in FIG. 6, the disk device controller 1 reads the device information and the management information from the first disk device 4 and the second disk device 5 and then output them to the master disk decider 2 (step S41).

Also, the master disk decider 2 reads the reference device information from the reference device information holder 3 (step S42).

The master disk decider 2 can decide which one of the first disk device 4 and the second disk device 5 corresponds to the master disk, based on the device information held in the first disk device 4 and the second disk device 5, the management information read from the first disk device 4 and the second disk device 5, and the reference device information held in the reference device information holder 3.

That is, the master disk decider 2 compares the partition information read from the first disk device 4 and the second disk device 5 with the partition information held in the reference device information holder 3 (step S43).

If both partition information read from the first disk device 4 and the second disk device 5 do not coincide with the partition information held in the reference device information holder 3, it is decided that both the first disk device 4 and the second disk device 5 are exchanged with the different type disk. Thus, since both disk devices are not set to the master disk, an error process is performed (step S44).

In step S43, if only the partition information of the first disk device 4 coincides with the partition information of the reference device information holder 3, the master disk decider 2 decides that only the second disk device 5 is exchanged with the different type disk, and thus decides the first disk device 4 as the master disk and the second disk device 5 as the slave disk (step S45), and then copies the data contents of the first disk device 4 into the second disk device 5 (step S46).

In step S43, if only the partition information of the second disk device 5 coincides with the partition information of the reference device information holder 3, the master disk decider 2 similarly decides that only the first disk device 4 is exchanged with the different type disk, thus decides the second disk device 5 as the master disk and the first disk device 4 as the slave disk (step S47), and then copies the data contents of the second disk device 5 into the first disk device 4 (step S48).

In step S43, if both partition information read from the first disk device 4 and the second disk device 5 coincide with the partition information held in the reference device information holder 3, the master disk decider 2 compares the MAC addresses read from the first disk device 4 and the second disk device 5 with the MAC addresses held in the reference device information holder 3 (step S49).

If only the MAC address of the first disk device 4 coincides with the MAC address of the reference device information holder 3, the master disk decider 2 decides the first disk device 4 as the master disk and the second disk device 5 as the slave disk (step S45), and then copies the data contents of the first disk device 4 into the second disk device 5 (step S46).

In step S49, if only the MAC address of the second disk device 5 coincides with the MAC address of the reference device information holder 3, the master disk decider 2 decides the second disk device 5 as the master disk and the first disk device 4 as the slave disk (step S47) and then copies the data contents of the second disk device 5 into the first disk device 4 (step S48).

In step S49, both MAC addresses of the first disk device 4 and the second disk device 5 coincide with the MAC address of the reference device information holder 3, the master disk decider 2 performs the similar processes (update time decision, flag decision) to those in FIG. 4.

In step S49, both MAC addresses of the first disk device 4 and the second disk device 5 do not coincide with the MAC address of the reference device information holder 3, the master disk decider 2 decides the master disk by performing the similar processes (flag decision, update time decision) to those in FIG. 5.

According to the embodiment 3, since the MAC address and the partition information are employed as the device information, it can be checked whether the hard disk is exchanged, further, it can also be checked whether the type of the exchanged hard disk coincides with the type of the hard disk previous to the exchange. Therefore, the master disk can be decides precisely even if one of the hard disks is exchanged with the different type disk, and thus the consistency of the data contents stored in the hard disks can be compensated.

In the explanation of the embodiment 3, the example in which the MAC address is used as the reference device information is discussed. In this case, information except the MAC address may be employed if they exhibit a value peculiar to the device. In addition, the example in which the partition information is used as the reference device information is discussed. In this case, information except the partition information may be employed if they can decide the type of the hard disk.

According to the duplex disk controller of the present invention, since the device number peculiar to the disk device controller is assigned to and held in the first disk device and the second disk device respectively, either one of the first disk device and the second disk device can be decided as the master disk based on the held device number even if one of or both the first disk device and the second disk device are exchanged.

Also, since the management information which are combination of the data update time and the flag having different states before and after data update, in addition to the reference device information are utilized as the decision factors of the master disk, reliability of the decision of the master disk can be improved much more.

Also, the MAC address peculiar to the device may be employed as the reference device information. In this case, the master disk can be decided simply without special setting.

Also, since the partition information in addition to the MAC address as the reference device information may be employed as the decision factors, the type of the disk device can be identified and thus the decision of the master disk can be performed more precisely.

Since the data can be copied from the master disk to the slave disk by deciding the master disk as above, the consistency of the data contents between the first disk device and the second disk device can be compensated.

What is claimed is:

1. A duplex disk controller comprising:
    a first disk device which holds first device information;
    a second disk device which holds second device information;
    a disk device controller for reading/writing data from/to the first disk device and the second disk device and reading/writing management information including a data writing updated time and a status flag which is different before and after data writing update;
    a reference device information holder which holds peculiar reference device information previously; and
    a master disk decider which collates the first device information and the second device information with the reference device information to decide which one of the first disk device and the second disk device corresponds to a master disk, based on collated results and contents of the management information.

2. A duplex disk controller according to claim 1, wherein the reference device information, the first device information, and the second device information include MAC address.

3. A duplex disk controller according to claim 2, wherein the reference device information, the first device information, and the second device information further include partition information.

4. A duplex disk controlling method comprising steps of:
    reading reference device information from a reference device information holder;
    collating first device information held in a first disk device and second device information held in a second disk device with the reference device information; and
    deciding one of the first disk device and the second disk device as a master disk based on a collated result if only one of the first device information and the second device information coincides with the reference device information, and
    comparing management information stored in the first disk device with management information stored in the second disk device to decide the master disk if both the first device information and the second device information coincide or do not coincide with the reference device information.

5. The duplex disk controlling method according to claim 4, wherein the management information comprises a data writing update time and a status flag which is different before and after data writing update.

6. The duplex disk controlling method according to claim 5, wherein comparing the management information to decide the master disk comprises:
    comparing data writing update times from the first disk device and the second disk device, if both the first device information and the second device information coincide with the reference device information,
    selecting the first disk device as the master disk if the data writing update time from the first disk device is newer than the data writing update time from the second disk device,
    selecting the second disk device as the master disk if the data writing update time from the second disk device is newer than the data wring update time from the first disk device, and
    comparing status flags from the first disk device and the second disk device if the data writing update time from the first disk device coincides with the data writing update time from the second disk device,
    selecting the first disk device as the master disk if only the status flag read from the first disk device indicates after data writing update,
    selecting the second disk device as the master disk if only the status flag read from the second disk device indicates after data writing update, and selecting the first disk device as the master disk if each status flag from the first disk device and the second disk device indicates after data writing update, and selecting the first disk device as the master disk if each status flag from the first disk device and the second disk device indicates before data writing update.

7. The duplex disk controlling method according to claim 5, wherein comparing the management information to decide the master disk further comprises:

comparing status flags from the first disk device and the second disk device, if both the first device information and the second device information do not coincide with the reference device information, selecting the first disk device as the master disk if only the status flag read from the first disk device indicates after data writing update, selecting the second disk device as the master disk if only the status flag read from the second disk device indicates after data writing update, comparing data writing update times from the first disk device and the second disk device, if the status flag from each of the first disk device and the second disk device indicates after data writing update or each indicates before data writing update, selecting the first disk device as the master disk if the data writing update time from the first disk device is newer than the data writing update time from the second disk device, selecting the second disk device as the master disk if the data writing update time from the second disk device is newer than the data wring update time from the first disk device, and selecting the first disk device as the master disk if the data writing update time from the first disk device coincides with the data writing update time from second disk device.

8. The duplex disk controlling method according to claim 5, wherein the status flag is a mismatching flag before data writing update and a matching flag after data writing update.

9. A duplex disk controlling method comprising steps of:

reading reference device information from a reference device information holder;

collating first device information held in a first disk device and second device information held in a second disk device with the reference device information; and deciding one of the first disk device and the second disk device as a master disk based on a collated result, wherein the reference device information, the first device information, and the second device information include a first device data and a second device data, wherein deciding the master disk based on a collated result comprises:

comparing the first device data of the first device information and the second device information with the first device data of the reference device information, selecting an error process if both the first device data of the first device information and the second device information do not coincide with the first device data of the reference device information, selecting the first disk device as the master disk if only the first device data of the first device information coincides with the first device data of the reference device information, selecting the second disk device as the master disk if only the first device data of the second device information coincides with the first device data of the reference device information, comparing the second device data of the first device information and the second device information with the second device data of the reference device information, if both the first device data of the first device information and the second device information device coincide with the first device data of the reference device information, selecting the first disk device as the master disk if only the second device data of the first device information coincides with the second device data of the reference device information, and selecting the second disk device as the master disk if only the second device data of the second device information from the second disk device coincides with the second device data of the reference device information.

10. The duplex disk controlling method according to claim 9, wherein the reference device information, the first device information, and the second device information include partition information as the first device data and MAC address as the second device data.

* * * * *

UNITED STATES PATENT AND TRADEMARK OFFICE
CERTIFICATE OF CORRECTION

PATENT NO. : 6,684,307 B2
DATED : January 27, 2004
INVENTOR(S) : Yasuhiro Kikuchi et al.

It is certified that error appears in the above-identified patent and that said Letters Patent is hereby corrected as shown below:

Column 2,
Line 13, please delete "step 580)", and insert therefor -- step S80) --.

Column 6,
Line 8, after "(step S31)", please insert -- . -- (period).
Line 49, please delete "step 537", and insert therefor -- step S37 --.

Column 7,
Line 40, after "device", please insert -- 5. --.

Signed and Sealed this

Thirty-first Day of August, 2004

JON W. DUDAS
*Director of the United States Patent and Trademark Office*